(12) United States Patent
Ichioka et al.

(10) Patent No.: US 6,618,546 B2
(45) Date of Patent: Sep. 9, 2003

(54) RECORDING/PLAYING APPARATUS AND CONTENTS MANAGING METHOD

(75) Inventors: Hidetoshi Ichioka, Tokyo (JP); Masaki Ishida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/919,287

(22) Filed: Jul. 30, 2001

(65) Prior Publication Data

US 2002/0012517 A1 Jan. 31, 2002

(30) Foreign Application Priority Data

Jul. 31, 2000 (JP) ..................................... P 2000-231202

(51) Int. Cl.[7] .............................. H04N 5/91; H04N 7/00
(52) U.S. Cl. ........................... 386/46; 386/83; 386/125; 386/95; 360/57
(58) Field of Search .............................. 386/46, 95, 83, 386/125–126, 40, 124; H04N 5/91, 7/00

(56) References Cited

U.S. PATENT DOCUMENTS

| 5,745,640 A | * | 4/1998 | Ishii et al. ..................... 386/83 |
| 5,796,828 A | * | 8/1998 | Tsukamoto et al. ......... 380/203 |
| 6,014,280 A | * | 1/2000 | Chizawa et al. .............. 360/66 |
| 6,351,599 B1 | * | 2/2002 | Komeno ....................... 386/70 |

FOREIGN PATENT DOCUMENTS

WO    WO 9222983    * 12/1992

* cited by examiner

Primary Examiner—Vincent Boccio
Assistant Examiner—James A. Fletcher
(74) Attorney, Agent, or Firm—Frommer Lawrence & Haug LLP; William S. Frommer; Dennis M. Smid

(57) ABSTRACT

In a first step, contents scheduled in the "past" of a virtual channel are extracted, in a second step one of the contents is selected, in the event that judgment is made in a third step that the contents are not in a playable state the flow proceeds to a seventh step but in the event that judgment is made that the contents are in a playable state judgement is made in a fourth step whether the corresponding contents have already been scheduled n times (n being a number for sufficient opportunity for viewing or listening) in the future. In the event that the number is less than n times, the contents are placed in the future at the time of the next scheduling in a fifth step, but in the event that the number is n times, in a sixth step the contents are set in a state to be deleted. In the event that judgment is made in the seventh step that processing of the all of the extracted contents has not been completed, the flow returns to the second step, but in the event that judgment is made that all processing has been completed, the flow ends. Thus, contents regarding which the user has no interest are automatically deleted.

4 Claims, 7 Drawing Sheets

FIG. 3

```
class SchedulingUnit
{
        Time startTime;
        long durationTime;
        int status;
        String title;
        Set categories;
        TVContent source;
        Date lastAccessedTime;
        int theNumberOfScheduledInFuture;

}
```

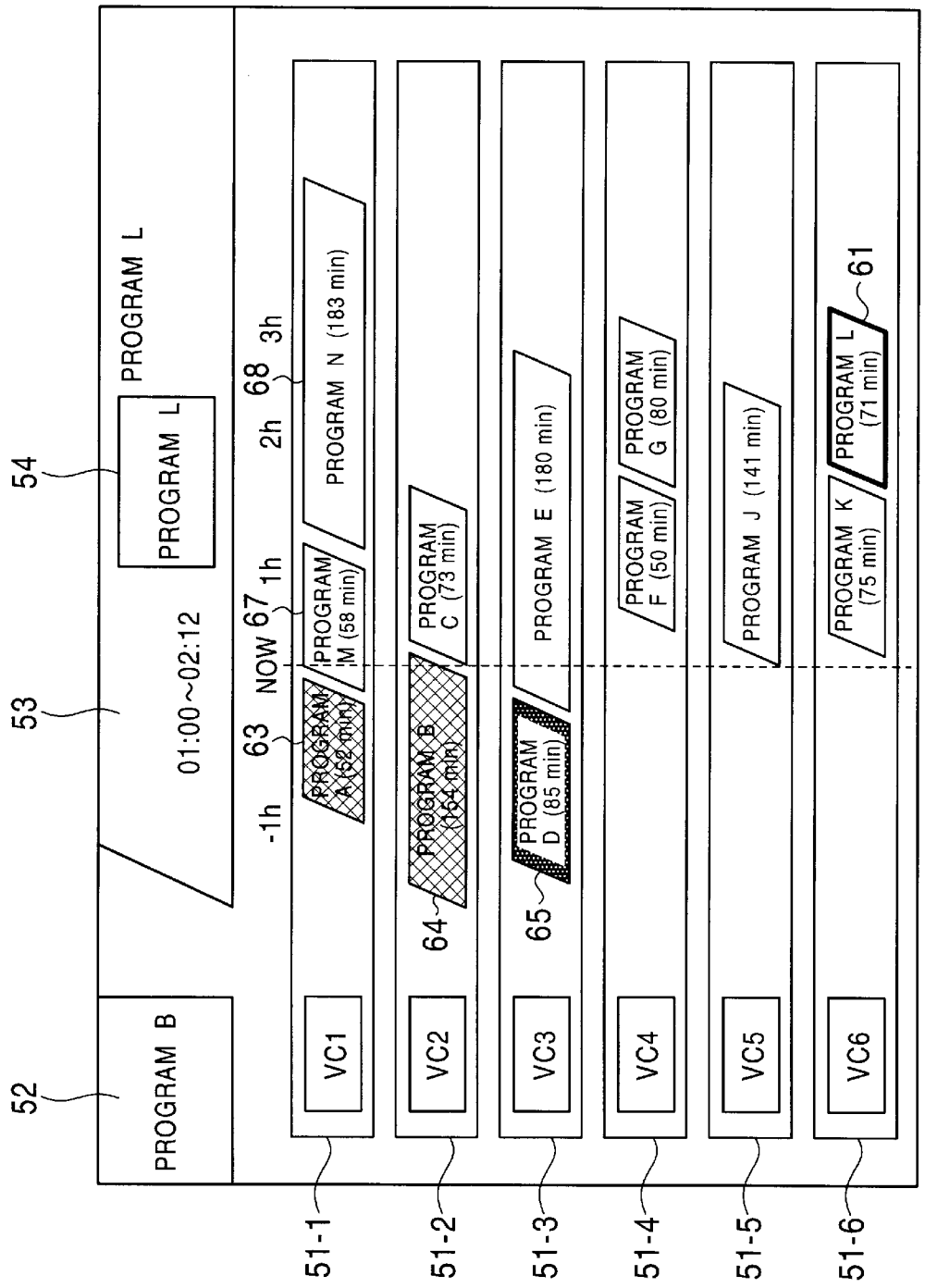

RECORDING/PLAYING APPARATUS AND CONTENTS MANAGING METHOD

BACKGROUND OF THE INVENTION

1. Field of the Invention

The present invention relates to a recording/playing apparatus and contents managing method, and more particularly relates to a recording/playing apparatus and contents managing method which can provide users with sufficient opportunity to view or listen to contents, and which can automatically delete only contents which are truly unnecessary to the users, i.e., which can accurately reflect the intents of users and manages contents accordingly.

2. Description of the Related Art

With conventional recording/playing apparatuses, users managing recorded program (contents) data have had to select themselves unnecessary data, and delete the data.

Also, increased capacity of recording media such as hard disks has meant that great amounts of contents can be stored.

Consequently, in the event that the user can no longer grasp what is in the great amounts of contents stored, the user can no longer readily select unnecessary contents, so operation necessary for deleting unnecessary contents becomes extremely troublesome for the user. Further, cases can be anticipated wherein the user has recorded contents which he/she is interested in, but these contents become buried in the great amount of stored contents and remain unviewed or not listened to, and eventually are erroneously deleted without being viewed or listened to.

There are techniques for solving the troublesome contents deletion operation by automatically deleting the accumulated contents. With the technique for automatically deleting accumulated contents, contents which have remained a predetermined number of days following storing without being viewed or listened to are automatically deleted.

However, with the arrangement of the conventional technique for automatically deleting contents, the user is not given sufficient opportunity to view or listen to the stored contents, so there may be cases wherein the user records contents he/she is interested in but does not notice the recorded contents and loses the opportunity to view or listen to the stored contents, which may result in contents which the user is interested in being automatically deleted.

SUMMARY OF THE INVENTION

The present invention has been made in light of such problems, and accordingly, it is an object thereof to provide a recording/playing apparatus and contents managing method which can provide users with sufficient opportunity to view or listen to contents, and which can automatically delete only contents which are truly unnecessary to the users, i.e., a recording/playing apparatus and contents managing method which can accurately reflect the intents of users and manages contents accordingly.

The recording/playing apparatus according to the present invention comprises: obtaining means for obtaining contents; recording control means for controlling recording of a plurality of the contents obtained by the obtaining means; generating means for generating management information, including the status of the plurality of contents of which recording is controlled by the recording control means, and the number of times of opportunities for viewing or listening to the contents that has been provided to the contents, and for changing the management information as necessary; first extracting means for extracting, from the plurality of contents of which recording is controlled by the recording control means, the contents to which a predetermined number of times of opportunities for viewing or listening has already been provided but viewing or listening thereof has not been carried out yet, based on the management information generated by the generating means; judging means for judging whether or not there are any contents in the plurality of contents of which recording is controlled by the recording control means regarding which deleting is necessary; and deletion control means for controlling deleting of the contents regarding which the status of the contents contained in the management information is "deletion planned", in the event that judgment is made by the judging means that deleting of the contents is necessary; wherein the generating means changes the status of the contents contained in the management information corresponding to the contents extracted by the first extracting means, to "deletion planned".

The recording/playing apparatus according to the present invention may further comprise second extracting means for extracting, from the contents of which recording is controlled by the recording control means, the contents regarding which viewing or listening thereof has been completed and also regarding which the date-and-time when last viewed or listened to is the oldest, based on the management information generated by the generating means; wherein the management information may further contain information relating to the date-and-time when last viewed or listened to, in the event that viewing or listening thereof has been completed regarding the contents; and wherein, in the event that, following control of deletion of the contents regarding which the status contained in the management information is "deletion planned" by the deletion control means, judgment is made by the judging means that deletion of the contents is necessary, the second extracting means may extract the contents regarding which viewing or listening thereof has been completed and regarding which the date-and-time when last viewed or listened to is the oldest; and wherein the generating means may change the status of the contents contained in the management information corresponding to the contents extracted by the second extracting means, to "deletion planned".

The contents managing method according to the present invention comprises: an obtaining step for obtaining contents; a recording control step for controlling recording of a plurality of the contents obtained by the processing in the obtaining step; a generating step for generating management information, including the status of the plurality of contents of which recording is controlled by the processing in the recording control step, and the number of times of opportunities for viewing or listening to the contents that has been provided to the contents, and for changing the management information as necessary; a first extracting step for extracting, from the plurality of contents of which recording is controlled by the processing in the recording control step, the contents to which a predetermined number of times of opportunities for viewing or listening has already been provided but viewing or listening thereof has not been carried out yet, based on the management information generated by the processing in the generating step; a judging step for judging whether or not there are any contents in the plurality of contents of which recording is controlled by the processing in the recording control step regarding which deleting is necessary; and a deletion control step for controlling deleting of the contents regarding which the status of the contents contained in the management information is "deletion planned", in the event that judgment is made by the processing in the judging step that deleting of the contents is necessary; wherein the processing the generating step changes the status of the contents contained in the management information corresponding to the contents extracted by the processing in the first extracting step, to "deletion planned".

The contents managing method according to the present invention may further comprise a second extracting step for extracting, from the contents of which recording is controlled by the processing in the recording control step, the contents regarding which viewing or listening thereof has been completed and also regarding which the date-and-time when last viewed or listened to is the oldest, based on the management information generated by the processing in the generating step; wherein the management information may further contain information relating to the date-and-time when last viewed or listened to, in the event that viewing or listening thereof has been completed regarding the status of the contents; and wherein, in the event that, following control of deletion of the contents regarding which the status of contents contained in the management information is "deletion planned" by the processing in the deletion control step, judgment is made by the processing in the judging step that deletion of the contents is necessary, the processing in the second extracting step may extract the contents regarding which viewing or listening thereof has been completed and regarding which the date-and-time when last viewed or listened to is the oldest; and wherein the processing in the generating step may change the status of the contents contained in the management information corresponding to the contents extracted by the processing in the second extracting step, to "deletion planned".

With the recording/playing apparatus and contents managing method, contents are obtained; recording of the plurality of contents obtained is controlled; management information is generated, including the status of the plurality of contents of which recording is controlled, and the number of times of opportunities for viewing or listening to the contents that has been provided to the contents; the management information is changed as necessary; the contents to which a predetermined number of times of opportunities for viewing or listening has already been provided but viewing or listening thereof has not been carried out yet are extracted from the plurality of contents of which recording is controlled, based on the management information generated; the status of the contents contained in the management information corresponding to the extracted contents is changed to "deletion planned"; judgment is made whether or not there are any contents in the plurality of contents of which recording is controlled regarding which deleting is necessary; and deleting of the contents regarding which the status of the contents contained in the management information is "deletion planned" is controlled, in the event that judgment is made that deleting of the contents is necessary.

BRIEF DESCRIPTION OF THE DRAWINGS

FIG. 3 is a diagram for explaining a scheduling unit;

FIG. 7 is a diagram for explaining a virtual channel schedule table.

DESCRIPTION OF THE PREFERRED EMBODIMENTS

The following is a description of embodiments of the present invention, with to the drawings.

Figure 1:
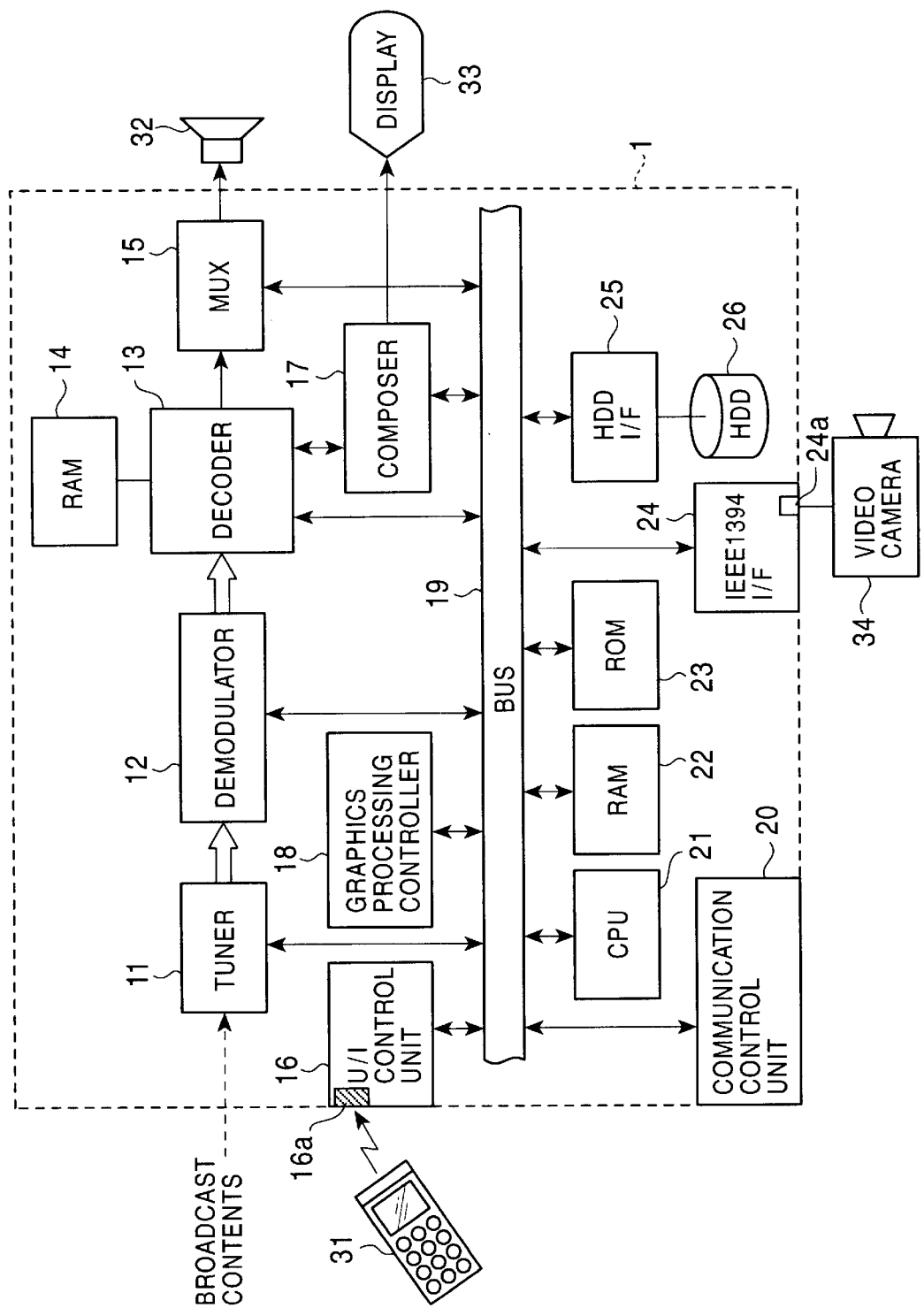
FIG. 1 is a block diagram illustrating the configuration of a hard disk recorder to which the present invention has been applied.

FIG. 1 is a block diagram illustrating a configuration example of a hard disk recorder 1. This hard disk recorder 1 is capable of recording a great number of pictures in a HDD (Hard disk drive) 26 having massive capacity, and can precisely grasp the intent of users and reflect this in saving and managing of recorded pictures. Note that the hard disk recorder 1 can be mounted as audio-visual equipment, and can be integrally configured with, for example, a television receiver such as a set-top box (STB).

Broadcast waves received with an antenna not shown in the drawings are supplied to a tuner 11. The broadcast waves are based on a predetermined format, and may include, for example, EPG (Electronic Program Guide) data. The broadcast waves may be satellite broadcast waves, ground waves, cable, or wireless, i.e., no particular distinction is made between any of these.

The tuner 11 performs tuning of broadcast waves for a predetermined channel based on the control of the CPU 21, and outputs the received data to a demodulator 12. The configuration of the tuner 11 may be modified or expanded as appropriate depending on whether the broadcast waves being transmitted are analog or digital. The demodulator 12 demodulates the reception data digitally modulated, and outputs to the decoder 13.

For example, in the case of digital satellite broadcast, digital data received by the tuner 11 and demodulated by the demodulator 12 is a transport stream with multiplexed audio-visual data that has been compressed by MPEG2 and data broadcasting data. The former audio-visual data is picture data and audio data making up the broadcast contents itself, and the latter data broadcasting data contains data accompanying the broadcast contents itself (e.g., EPG data).

The decoder 13 separates the transport stream supplied from the demodulator 12 into the audio-visual data that has been compressed by MPEG2 and the data broadcasting data (e.g., EPG data). The data broadcasting data that has been separated is supplied to the HDD 26 via a bus 19 and HDD interface 25, and thus is saved.

In the event that an instruction has been made to output the received contents as is, the decoder 13 further separates the audio-visual data into compressed picture data and compressed audio data. The audio data that has been separated is subjected to PCM (Pulse Code Modulation) decoding, and output to a speaker 32 via a mixer (MUX) 15. The picture data that has been separated is expanded, then output to a display 33 via a composer 17.

In the event that an instruction has been made to record the received contents to the HDD 26, the decoder 13 outputs the unseparated audio-visual data to the HDD 26 via the HDD interface 25 and the bus 19. Also, in the event that an instruction has been made to play the contents recorded on the HDD 26, the decoder 13 receives input of audio-visual data from the HDD 26 via the HDD interface 25 and bus 19, separates the audio-visual data into compressed picture data and compressed audio data, and outputs each to the composer 17 or mixer 15.

RAM (Random Access Memory) 14 can save data of the above work performed by the decoder 13.

The composer 17 synthesizes the picture data input from the decoder 13 and picture data input from a graphics processing controller 18 if necessary, and outputs to the display 33. The display 33 displays (reproduces) the picture signals supplied form the composer 17. The speaker 32 outputs audio signals supplied from the mixer 15.

A U/I (User Interface) control unit 16 is a module for processing input operations made by a user. For example, in the event that a remote commander 31 comprising an operating button or switch is operated by the user, operating signals (IR signals) emitted from an infrared ray emitting unit (not shown) is received with a photo-receptor 16a, and output to a CPU 21.

The CPU 21 is a main controller for controlling the operation of the entire hard disk recorder 1, and executes various applications on a platform provided by operating system software. The CPU 21 controls, for example, the tuner 11, demodulator 12, decoder 13, HDD 26, etc., based on signals input from the remote commander 31 via the U/I control unit 16 and bus 19, thereby recording or playing contents.

Also, the CPU 21 generates scheduling units (described later with reference to FIG. 3) for each set of contents recorded in the HDD 26, based on the broadcast data such as EPG, outputs this to the HDD 26 to save via the bus 19 and the HDD interface 25, reads out the scheduling unit saved in the HDD 26, rewrites this as necessary, and thus manages the contents saved in the HDD 26 based on this.

The HDD 26 is a randomly-accessible storage device capable of storing programs and data and the like as files of predetermined formats, and has a massive capacity of several tens of gigabytes to over 100 gigabytes, for example. The HDD 26 is connected to the bus 19 via the HDD interface 25, receives and records input of broadcast contents and data broadcasting data such as EPG data from the decoder 13 or communication control unit 20, and outputs this information as necessary.

The HDD 26 has an area for saving scheduling units for each set of contents, described later with reference to FIG. 3. Scheduling units are read into the CPU 21 via the HDD interface 25 and bus 19 as necessary. Thus, the CPU 21 can execute predetermined processing following predetermined applications, and manage contents stored in the HDD 26 such as scheduling virtual channels (described later with reference to FIG. 2) every predetermined unit of time.

The graphics processing controller 18 is a dedicated controller for generating image data, having high drawing capabilities equivalent to, for example, SVGA (Super Video Graphic Array) or XGA (extended Graphic Array). The graphics processing controller 18 generates, for example, GUI (Graphical User Interface) operating screens whereby users can make various types of input, data for a virtual channel schedule table described later with reference to FIG. 2, and so forth.

The communication control unit 20 controls online communication by telephone line or cable or the like, or wireless commination. Broadcast contents or EPG data is exchanged by communicating with a server system not shown in the drawings via this communication control unit 20. Broadcast contents input to the communication control unit 20 are input to the decoder 13 via the bus 19, and processed in the same manner as the broadcast data input via the tuner 11 and the demodulator 12. Also, communicating with external equipment via the communication control unit 20 allows input of data relating to contents not containing EPG data to be received, such as with ground wave broadcasts, for example. The data input to the communication control unit 20 is saved in the HDD 26 via the bus 19 and the HDD interface 25.

The RAM (Random Access Memory) 22 is writable volatile memory which is used for loading programs to be executed by the CPU 21, and writing data of work performed by programs being executed. The ROM (Read Only Memory) 23 is read-dedicated memory for storing self-diagnosis and initializing programs executed at the time of turning the power of the hard disk recorder 1 on, control code for operating the hardware, and so forth.

The IEEE (The Institute of Electrical and Electronics Engineers) 1394 interface 24 is a serial high-speed interface capable of transmitting and receiving data at around several tens of MBps. An IEEE 1394-compatible video camera 34 is connected to an IEEE1394 port 24a.

The contents recorded in the HDD 26 shown in FIG. 1 are appropriated to multiple virtual channels (VC), by the processing of the CPU 21. Virtual channels are configured of various categories such as, for example, channels for sports, news, variety, documentaries, etc., with each having its own time axis, and a playing schedule of the recorded contents being created every predetermined time unit, such as every 6 hours, 10 hours, 12 hours, or so forth.

Figure 2:
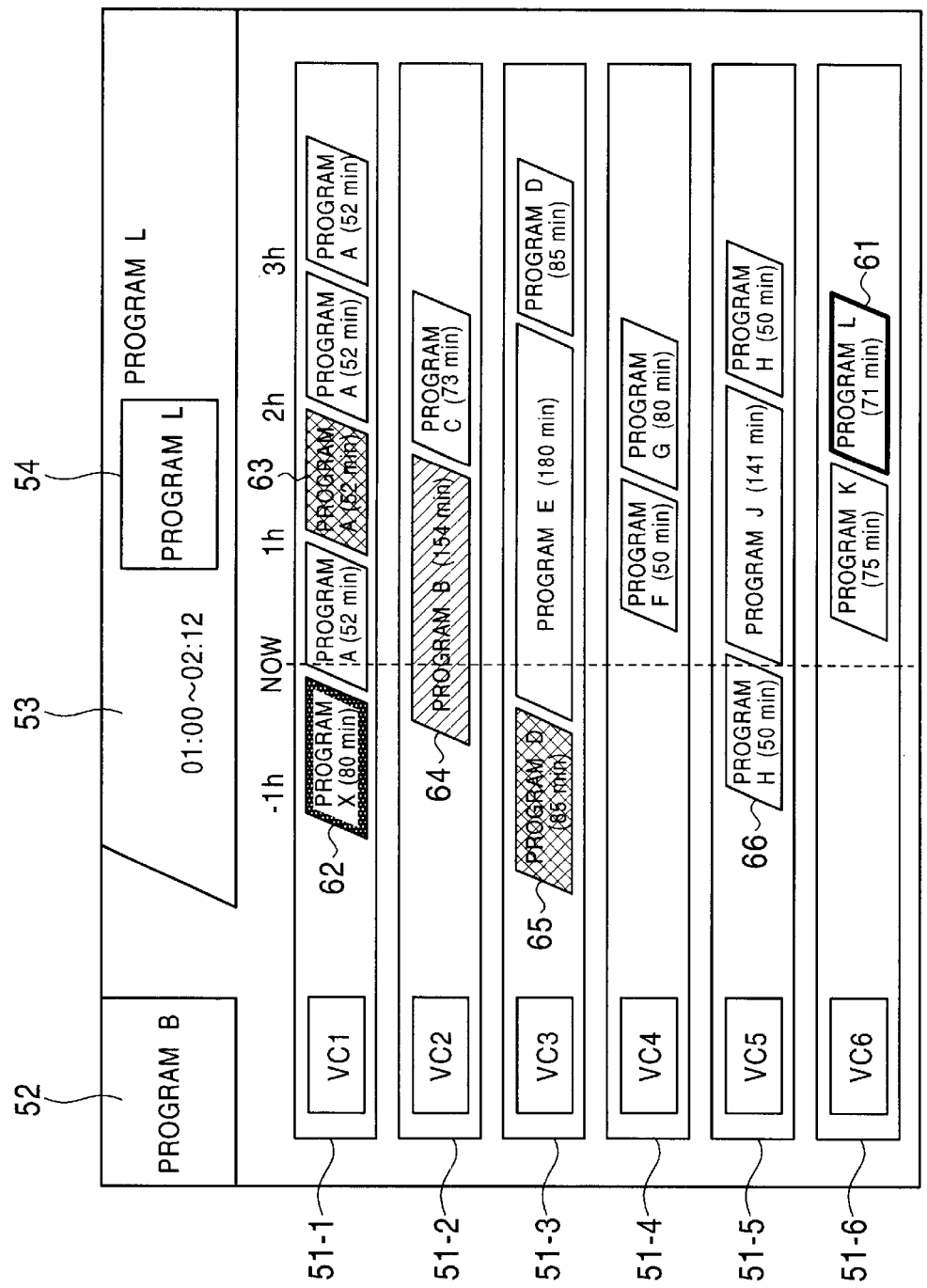
FIG. 2 is a diagram for explaining a virtual channel schedule table.

In the event that a user wants to confirm the schedule of a virtual channel, a virtual channel schedule table such as shown in FIG. 2 for example can be displayed on the display 33 by performing a predetermined operation using the remote commander 31.

In the virtual channel schedule table shown in FIG. 2, six virtual channels 51-1 through 51-6 are provided as a vertical axis, and each has its own 6-hour virtual time axis as the horizontal axis.

Progression of time in the virtual channel schedule table progresses in the same manner as with real time, regardless of whether other channels are being viewed or listened to or the power of the hard disk recorder 1 has been turned off. In the virtual channel schedule table shown in FIG. 2, the current time in the virtual channel schedule table indicated by "Now" in the diagram is displayed as shifting to the right in the screen so that the user can recognize the progression of time in the virtual channel. Or, the display position of "Now" does not change, and instead the position of icons representing contents move to the left in the drawing.

In the figure, the part to the right of the current time in the virtual channel schedule table indicated by "Now" will be referred to as "future", and that to the left thereof will be referred to as "past".

The contents recorded in the HDD 26 are scheduled to one of the virtual channels 51-1 through 51-6 based on the scheduling unit shown in FIG. 3.

In the scheduling unit, "startTime" is data indicating the date and time of the virtual channel schedule table for starting to play, "durationTime" is data indicating the length of the corresponding contents, and "status" is data indicating the status of the corresponding contents (i.e., deletion planned, viewing/listening completed, playable).

New contents are constantly being recorded to the HDD 26, but there is a limit to the capacity of the HDD 26, so unnecessary contents must be deleted. This necessitates selection of contents to be deleted, so the contents meeting predetermined conditions are selected as contents for which deletion is planned, by the processing which will be described later with reference to FIGS. 4 and 6.

"Viewing/listening completed" contents are contents which have already been viewed or listened to by the user, but are not set to the status of "deletion planned". "Playable" contents are all contents other than "deletion planned" and "viewing/listening completed" contents.

Whether each of the contents are placed in the "future" or the "past" at the time of scheduling is determined by making reference to the data listed in the status thereof. That is to say, contents regarding which the status is set to "deletion planned" or "viewing/listening completed" are scheduled in the "past" at the time of the next scheduling, and unless the user performs processing using a cursor 61 to select and play such contents, these contents never automatically gain opportunity to be played. Conversely, contents regarding which the status is set to "playable" are scheduled in the "future" at the next time for scheduling, so even in the event that the user does not consciously select the contents, the user may happen to see the contents while performing operations to switch between virtual channels, and thus there is the possibility that the contents will be viewed or listened to.

Once contents regarding which the status is set to "playable" are viewed or listened to, the status thereof is changed to "viewing/listening completed". The way in which contents regarding which the status is set to "playable" are changed to "deletion planned" is by a process described later with reference to FIG. 4 which changes the status thereof. Contents in the "viewing/listening completed" state are changed to the "deletion planned" state by the status thereof being changed by the processing described later with reference to FIG. 6.

In the scheduling unit, "title" is the title of the contents to be used for displaying the schedule table. "Categories" is data indicating the category of corresponding contents, and multiple categories can be set here. "source" is data indicating contents serving as the source of this scheduling unit.

Further, "lastAccessedTime" is data representing the date and time the corresponding contents were viewed or listened to last. Whenever contents recorded in the HDD 26 are played and viewed or listened to, the CPU 21 updates the data listed in the "lastAccessedTime" of the scheduling unit of the corresponding contents.

Moreover, "theNumberOfScheduledInFuture" indicates the number of times the corresponding contents have been placed in the "future" by scheduling. Whenever scheduling is performed, the CPU 21 updates the data listed in the "theNumberOfScheduledInFuture" of the scheduling unit of contents placed in the "future".

In the virtual channel schedule table, each of the contents recorded in the HDD 26 are displayed differently depending on the status thereof.

For example, a program X represented by an icon 62 is contents in the state of "deletion planned", and will be deleted in the event that the capacity of the HDD 26 is insufficient at the time of the next scheduling or at the time of recording new contents and some of the contents recorded must be deleted. Such "deletion planned" contents are displayed in a less conspicuous shade or in a grayed-out manner, for example.

For example, the program A represented by the icon 63 and the program D represented by the icon 65 are contents with the status of "viewing/listening completed". Contents with the status of "viewing/listening completed" are displayed with the color of the characters within the icon changed, for example.

All contents other than "deletion planned" and "viewing/listening completed" contents are "playable" contents, such as the program H represented by the icon 66. The "playable" contents are displayed with the characters in the icon in white, for example. The program B represented by the icon 64 is also "playable" contents, but is currently being played, and the entire icon is displayed in a different color, for example. Also, an in-play program display window 52 allows image data of the contents being played to be displayed.

Also, the user can operate keys not shown in the drawings on the remote commander 31 to move the cursor 61 on the virtual channel schedule table to an icon of arbitrary contents, thereby displaying information regarding the selected contents in the display area 53, and further displaying image information of the selected contents in the image display area 54 of the display area 53, thereby confirming what is in the desired contents on the virtual channel schedule table. In FIG. 2, the program L is selected by the cursor 61, so information relating to the program L is displayed in the display area 53, and image information of the program L is displayed in the image display area 54.

Then, pressing a confirm button not shown in the drawings on the remote commander 31 allows contents which the user desires to be played regardless of the current time on the virtual channel. For example, the program A represented by the icon 63 is placed in the "future", but is contents already viewed or listened to. That is to say, the program A has been played regardless of the current time on the virtual channel.

Then, at the point that 6 hours have elapsed from the previous scheduling, the CPU 21 executes rescheduling of the virtual channel schedule table, based on the scheduling unit.

Now, as described above, new contents are constantly being recorded to the HDD 26, but there is a limit to the capacity of the HDD 26, so unnecessary contents must be deleted. Contents with the highest priority for deletion are contents which have been recorded by the user and positioned for a predetermined number of times in "future" such that there has been opportunity for viewing or listening to, but nevertheless were not viewed or listened to, i.e., contents which were recorded but the user showed no interest in.

Figure 4:
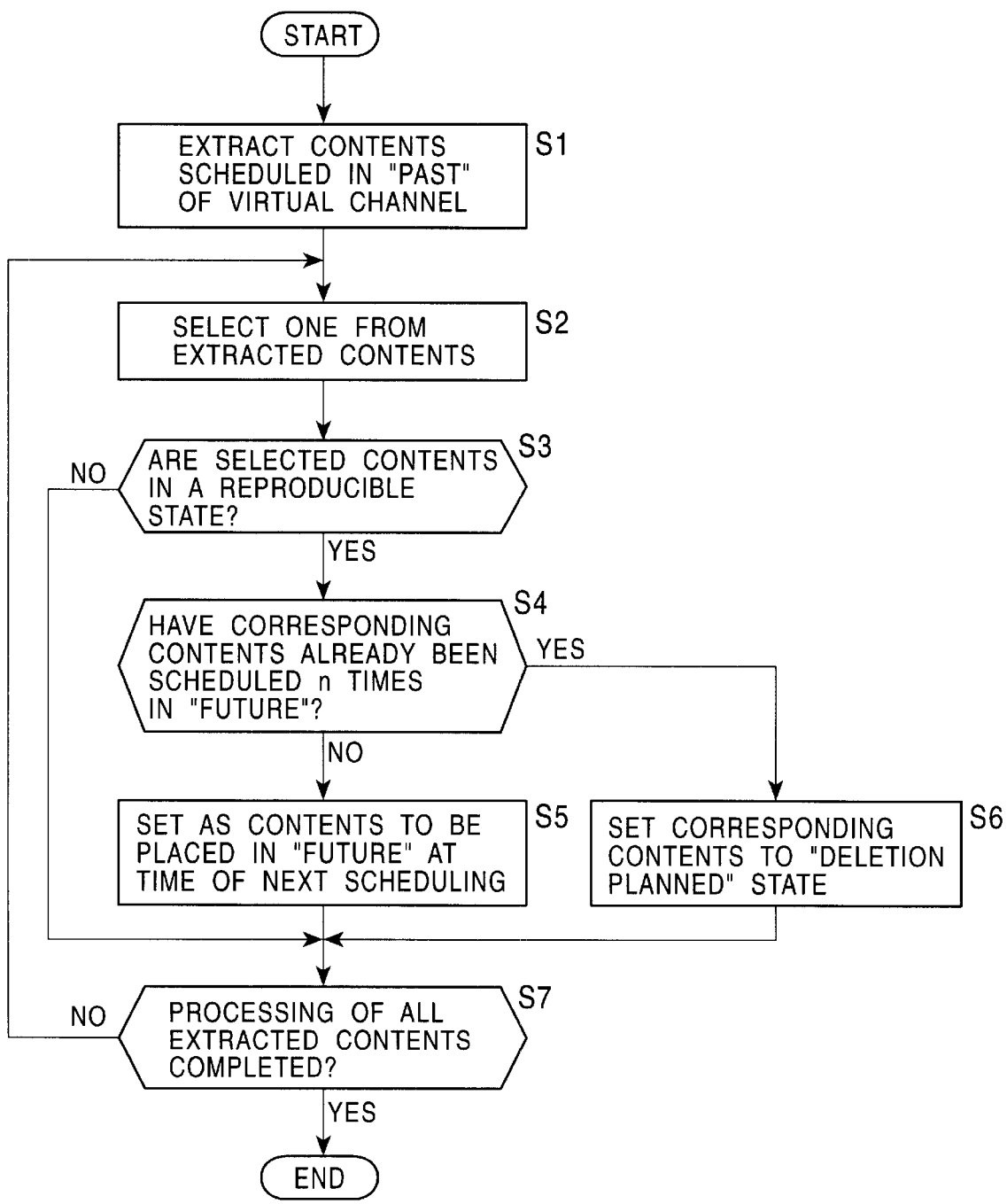
FIG. 4 is a flowchart for explaining processing for extracting contents regarding which the user showed no interest, and changing the status to "deletion planned"

The process for extracting contents which the user showed no interest in from the contents recorded in the HDD 26 (i.e., listed in the virtual channel schedule table) and been in the "playable" state, and changing the status of the scheduling unit corresponding to those contents to "deletion planned", will be described with reference to FIG. 4.

In step S1, the CPU 21 extracts the contents scheduled in the "past" of the virtual channel, and in step S2 selects one of the contents from the extracted contents.

In step S3, the CPU 21 makes reference to the status of the scheduling unit corresponding to the contents selected in step S2, and judges whether or not the contents are in a "playable" state. In the event that judgment is made in step S3 that the contents are not in a "playable" state, the contents are in a "deletion planned" or "viewing/listening completed" state, so the processing proceeds to step S7.

In step S3, in the event that judgment is made that the contents are in a "playable" state, in step S4 the CPU 21 makes reference to the "theNumberOfScheduledInFuture" of the scheduling unit corresponding to the contents selected in step S2, and makes judgment whether or not the corresponding contents have already been scheduled n times in the "future". Here, n times is a predetermined number of times whereby it can be understood that the user has been given sufficient opportunity of viewing or listening to particular contents.

In step S4, in the event that judgment is made that the corresponding contents have not yet been scheduled n times in the "future", in step S5 the CPU 21 does not change the status of the corresponding scheduling unit (i.e., the "playable" state is left as it is), and sets it to be contents scheduled in the "future" at the next scheduling.

On the other hand, in the event that judgment is made in step S4 that the corresponding contents have already been scheduled n times in the "future", in step S6 the CPU 21 changes the status of the corresponding scheduling unit at the next scheduling to "deletion planned".

In step S3, in the event that judgment is made that the contents are not in a "playable" state, following the processing of step S5 or step S6 the CPU 21 in step 7 makes judgment whether or not processing of all of the contents extracted in step S1 has been completed.

In the event that judgment is made in step S7 that processing of all of the contents extracted has not been completed, the flow returns to step S2, and the subsequent processing is repeated. In the event that judgment is made in step S7 that processing of all of the extracted contents has been completed, the processing ends here.

Figure 5:
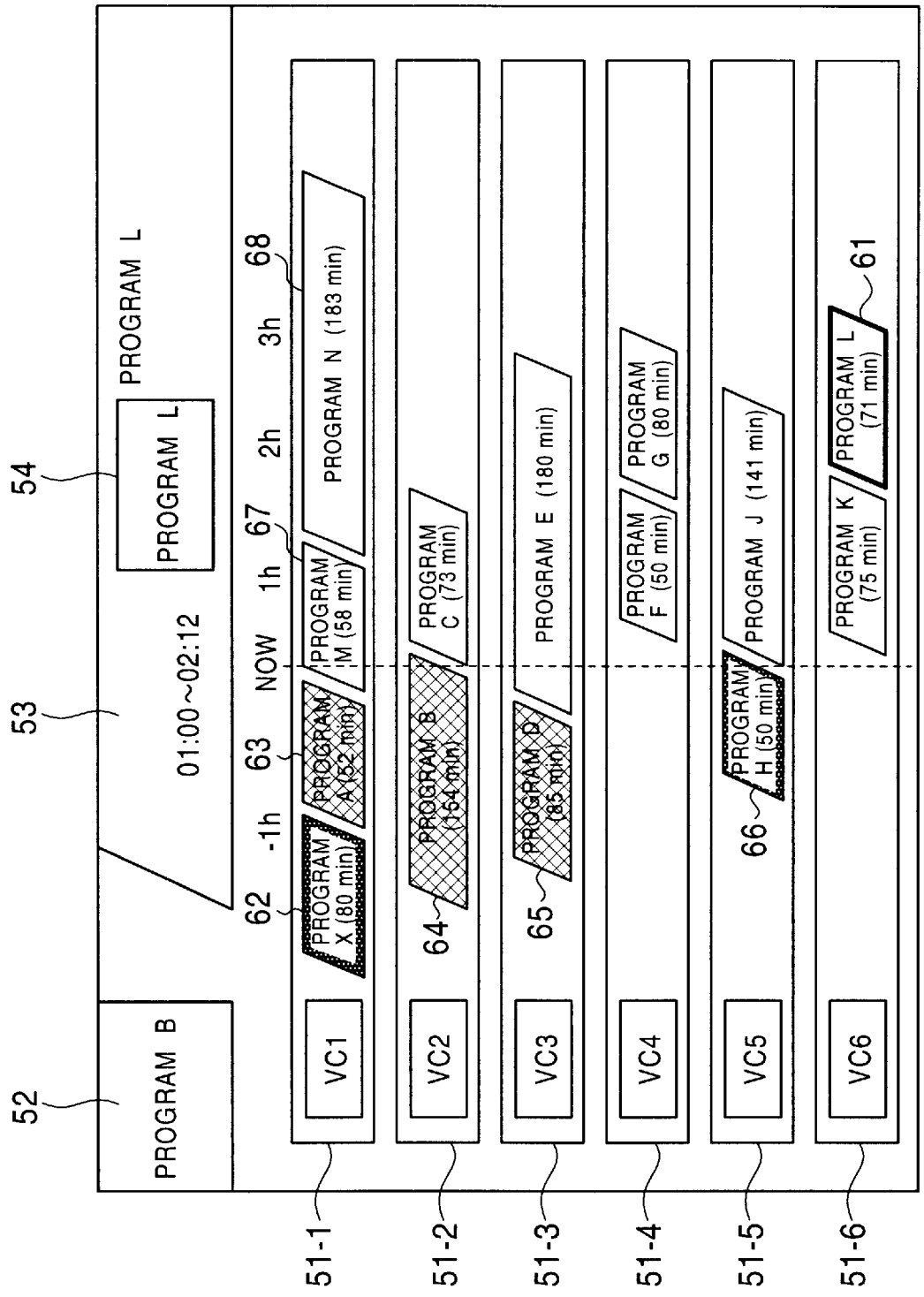
FIG. 5 is a diagram for explaining a virtual channel schedule table.

For example, in the virtual channel schedule table described with reference to FIG. 2, in the event that the program H represented by the icon 66 which is in the "playable" state is judged in step S4 to have been already scheduled n times in the "future", the status of the scheduling unit corresponding to the program H is changed to "deletion planned" in step S6. Then, at the time of the next scheduling, the program H represented by the icon 66 is scheduled in the "past", as shown in FIG. 5, and is deleted as necessary when new contents are recorded.

Also, contents newly recorded to the HDD 26 are scheduled in the "future" in the applicable virtual channel, based on the information listed in the "categories" of the scheduling unit thereof. Here, the program M represented by the icon 67 and the program N represented by the icon 68 are contents newly recorded to the HDD 26, and are scheduled in the virtual channel 51-1 based on the information listed in the "categories" of the scheduling units thereof.

Now, regarding contents which the user does not want to be deleted from the HDD 26 even if scheduled in the "future" n times or more, an arrangement may be made wherein, for example, a "deletion forbidden" state is provided beforehand in the status of the scheduling unit, thereby rendering such contents invulnerable to the deletion processing described with reference to FIG. 4.

According to the processing described above, contents regarding which the user is thought to have no interest in are changed to the "deletion planned" state, and deleted as necessary in the event that new contents are to be recorded. However, in cases wherein the recording capacity of the HDD 26 is insufficient for recording new contents regardless of deleting contents set to the "deletion planned" state with this processing, there is need to make new available capacity for recording new contents on the HDD 26 by changing the status of the contents in the "viewing/listening completed" state last viewed or listened to, to the "deletion planned" state, and deleting these contents.

Confirming of the available capacity on the HDD 26 may be performed by making reference to data broadcasting data such as EPG data for example, recorded in the HDD 26 beforehand, upon request of new recording reservation processing execution from the user for example, thereby confirming the available capacity necessary for saving the contents regarding which reservations are being made for recording. Or, an arrangement may be used wherein a predetermined amount of available capacity is always maintained as a standard on the HDD 26 so that new contents can be recorded.

The processing for selecting contents viewed or listened to at the earliest point in time from the contents in the "viewing/listening completed" state and changing the state of the contents to "deletion planned", will be described with reference to the flowchart shown in FIG. 6.

In step S11, the CPU 21 compares the currently-available capacity of the HDD 26 with the available capacity necessary on the HDD 26 (e.g., the data capacity of the contents to be recorded) thereby judging whether or not there is the need to select contents in the "viewing/listening completed" state to delete.

In the event that judgment is made in step S11 that there is no need to select something from the contents in the "viewing/listening completed" state, to delete (i.e., the available capacity on the HDD 26 is not insufficient), the processing ends. In the event that judgment is made in step S11 that there is the need to select something from the contents in the "viewing/listening completed" state to delete, (i.e., the available capacity on the HDD 26 is insufficient), in step S12 the scheduling units of the contents saved in the HDD 26 in the "viewing/listening completed" state are extracted by the CPU 21, reference is made to the lastAccessedTime thereof, and the content in the "viewing/listening completed" state regarding which the last point in time of viewing or listening is the oldest, is selected.

In step S13, the CPU 21 changes the status of the scheduling unit for the content selected in step S12 to the "deletion planned" state. Following the processing in step S13, the flow returns to step S11, and the subsequent processing is repeated until judgment is made that there is no more need to select something to delete from the contents in the "viewing/listening completed" state, (i.e., sufficient available capacity on the HDD 26 has been secured).

For example, let us consider a case with the virtual channel schedule table described with reference to FIG. 5, wherein even in the event that program X and program H which were in the "deletion planned" state are deleted, there is not sufficient available capacity on the HDD 26, and judgment is made in step S11 in FIG. 6 that something must be selected for deletion from the contents in the "viewing/listening completed" state.

In FIG. 5, in the event that the time indicated in the lastAccessedTime (i.e., the time viewed or listened to last) of the scheduling unit corresponding to the program D represented by the icon 65 in the "viewing/listening completed" state is an earlier point in time than the time indicated in the lastAccessedTime of the scheduling unit corresponding to the program A represented by the icon 63 or the program B represented by the icon 64 which are in the same "viewing/listening completed" state, the program D is selected in step S12, so in step S13 the status of the scheduling unit corresponding to the program D is changed to the "deletion planned" state.

Accordingly, at the time of the next scheduling, as shown in FIG. 7, the program D indicated by the icon 65 is scheduled in the "past" in the "deletion planned" state, and is deleted as necessary in the event that new contents are to be recorded. In the event that sufficient available capacity can be obtained by deleting the program D, the program A represented by the icon 63 or the program B represented by the icon 64 are kept unchanged in the "viewing/listening completed" state.

Figure 6:
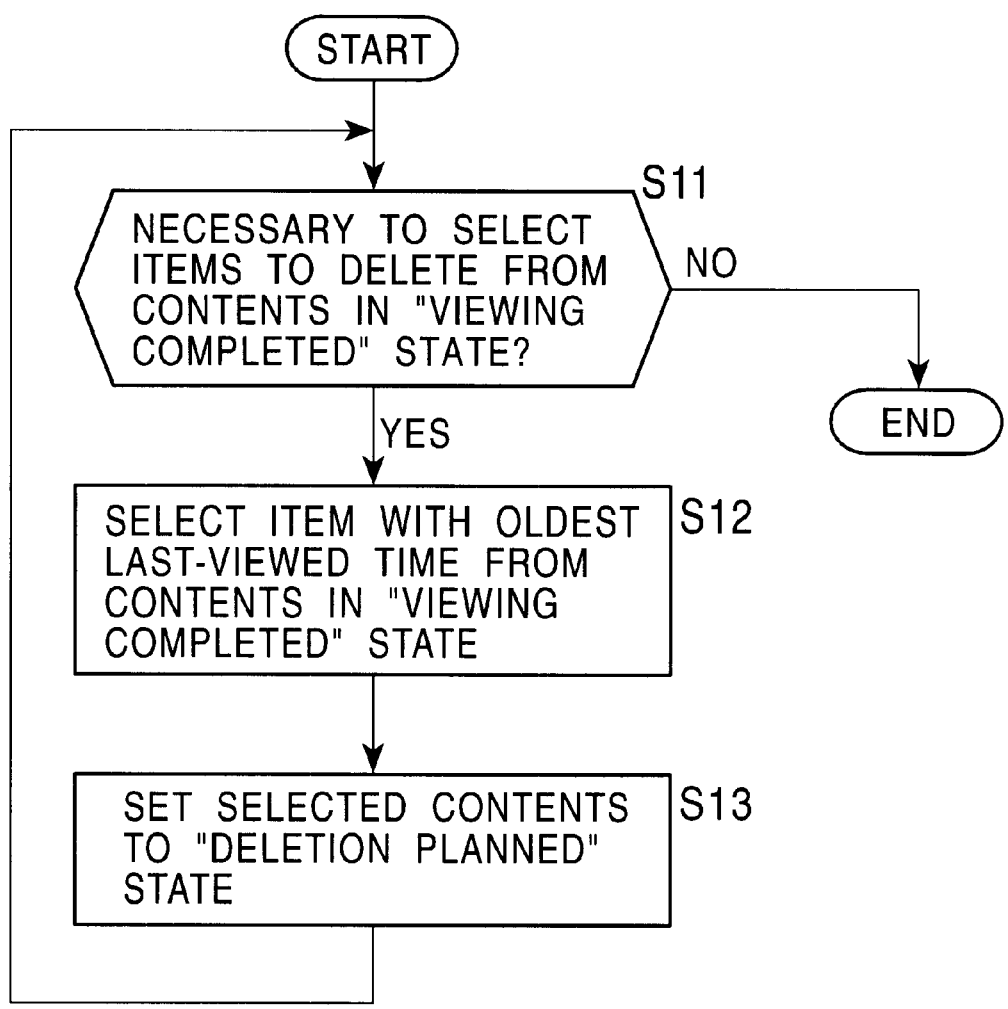
FIG. 6 is a flowchart for explaining processing for extracting contents regarding which viewing or listening to has been completed last, and changing the status to "deletion planned"

Further, regarding contents which the user does not want to be deleted from the HDD 26 even though a certain amount of time has passed from the last viewing or listening and the contents would normally be changed to the "deletion planned" state, an arrangement may be made wherein a "deletion forbidden" state is provided beforehand in the status of the scheduling unit, so the user can set contents which the user does not want to be deleted to the "deletion forbidden" state, thereby rendering such contents invulnerable to the deletion processing described with reference to FIG. 6.

Thus, executing the processing described above allows contents which are saved in the HDD 26 but the user has no interest in to be automatically deleted, with the user performing no particular operations to that end.

With the recording/playing apparatus and contents managing method according to the present invention, contents are obtained; recording of the plurality of contents obtained is controlled; management information is generated, including the status of the plurality of contents of which recording is controlled, and the number of times of opportunities for viewing or listening to the contents that has been provided to the contents; the management information is changed as necessary; the contents to which a predetermined number of times of opportunities for viewing or listening has already been provided but viewing or listening thereof has not been carried out yet are extracted from the plurality of contents of which recording is controlled, based on the management information generated; the status of the contents contained in the management information corresponding to the extracted contents is changed to "deletion planned"; judgment is made whether or not there are any contents in the plurality of contents of which recording is controlled regarding which deleting is necessary; and deleting of the contents regarding which the status of the contents contained in the management information is "deletion planned" is controlled, in the event that judgment is made that deleting of the contents is necessary; so contents saved in a recording medium such as a HDD for example regarding which sufficient opportunity for viewing or listening to have been provided but the user has not viewed or listened to, i.e., contents regarding which the user can be considered to have no interest in, are selected, and automatically deleted as necessary, with the user performing no particular operations to that end.

What is claimed is:

1. A recording/playing apparatus, comprising:

obtaining means for obtaining contents;

recording control means for controlling recording of a plurality of said contents obtained by said obtaining means;

generating means for obtaining management information, including a status of said plurality of contents of which recording is controlled by said recording control means, and a time period in which viewing or listening to said contents has been provided to said contents, and for changing said management information as necessary;

first extracting means for extracting, from said plurality of contents of which recording is controlled by said recording control means, contents which have been available for viewing or listening for a predetermined time period that have not been requested by a user for viewing or listening therein such that said contents have not been viewed or listened to within said predetermined time period, and in accordance with the management information obtained by said generating means;

judging means for judging whether or not there are any contents in said plurality of contents of which recording is controlled by said recording control means regarding which deleting is necessary; and deletion control means for controlling deleting of said contents regarding which the status of said contents contained in said management information is "deletion planned", in the event that judgment is made by said judging means that deleting of said contents is necessary;

wherein said generating means automatically changes the status of said contents contained in said management information corresponding to said contents extracted by said first extracting means, to "deletion planned".

2. A recording/playing apparatus according to claim 1, further comprising:

second extracting means for extracting, from said contents of which recording is controlled by said recording control means, said contents regarding which viewing or listening thereof has been completed and also regarding which the date-and-time when last viewed or listened to is the oldest, based on said management information generated by said generating means;

wherein said management information further contains information relating to the date-and-time when last viewed or listened to, in the event that viewing or listening thereof has been completed regarding said contents;

and wherein, in the event that, following control of deletion of said contents regarding which the status contained in said management information is "deletion planned" by said deletion control means, judgment is made by said judging means that deletion of said contents is necessary, said second extracting means extracts said contents regarding which viewing or listening thereof has been completed and regarding which the date-and-time when last viewed or listened to is the oldest;

and wherein said generating means changes the status of said contents contained in said management information corresponding to said contents extracted by said second extracting means, to "deletion planned".

3. A contents managing method, comprising:

an obtaining step for obtaining contents;

a recording control step for controlling recording of a plurality of said contents obtained by the processing in said obtaining step;

a generating step for obtaining management information, including a status of said plurality of contents of which recording is controlled by the processing in said recording control step, and a time period in which viewing or listening to said contents has been provided to said contents, and for changing said management information as necessary;

a first extracting step for extracting, from said plurality of contents of which recording is controlled by the processing in said recording control step, contents which have been available for viewing or listening for a predetermined time period that have not been requested by a user for viewing or listening therein such that said contents have not been viewed or listened to within said predetermined time period, and in accordance with the management information obtained by the processing in said generating step;

a judging step for judging whether or not there are any contents in said plurality of contents of which recording is controlled by the processing in said recording control step regarding which deleting is necessary; and a deletion control step for controlling deleting of said contents regarding which the status of said contents contained in said management information is "deletion planned", in the event that judgment is made by the processing in said judging step that deleting of said contents is necessary;

wherein said generating step automatically changes the status of said contents contained in said management information corresponding to said contents extracted by the processing in said first extracting step, to "deletion planned".

4. A contents managing method according to claim 3, further comprising:

a second extracting step for extracting, from said contents of which recording is controlled by the processing in said recording control step, said contents regarding which viewing or listening thereof has been completed and also regarding which the date-and-time when last viewed or listened to is the oldest, based on said management information generated by the processing in said generating step;

wherein said management information further contains information relating to the date-and-time when last viewed or listened to, in the event that viewing or listening thereof has been completed regarding the status of said contents;

and wherein, in the event that, following control of deletion of said contents regarding which the status of contents contained in said management information is "deletion planned" by the processing in said deletion control step, judgment is made by the processing in said judging step that deletion of said contents is necessary, the processing in said second extracting step extracts said contents regarding which viewing or listening thereof has been completed and regarding which the date-and-time when last viewed or listened to is the oldest;

and wherein the processing in said generating step changes the status of said contents contained in said management information corresponding to said contents extracted by the processing in said second extracting step, to "deletion planned".

* * * * *